Dec. 23, 1969    R. F. RISSE ETAL    3,485,531
PROGRAM CONTROLLED CONTOUR CUTTING BORING MINER
Filed Feb. 26, 1968    5 Sheets-Sheet 3
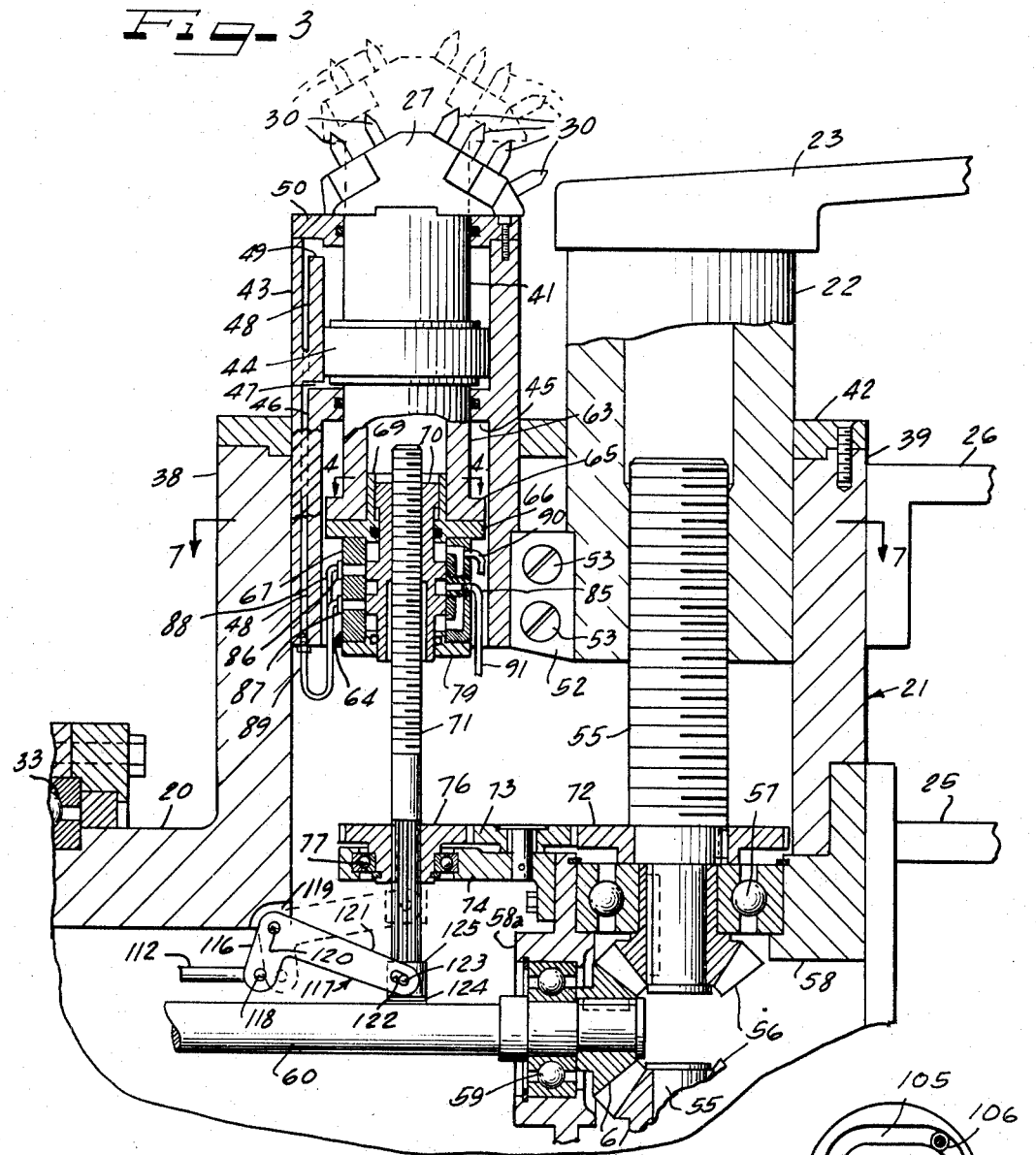
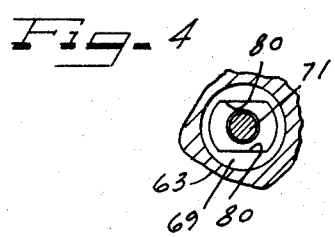
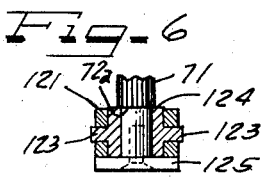
INVENTORS
HOWARD E. SHELLEY
RALPH F. RISSE
BY
ATTORNEYS

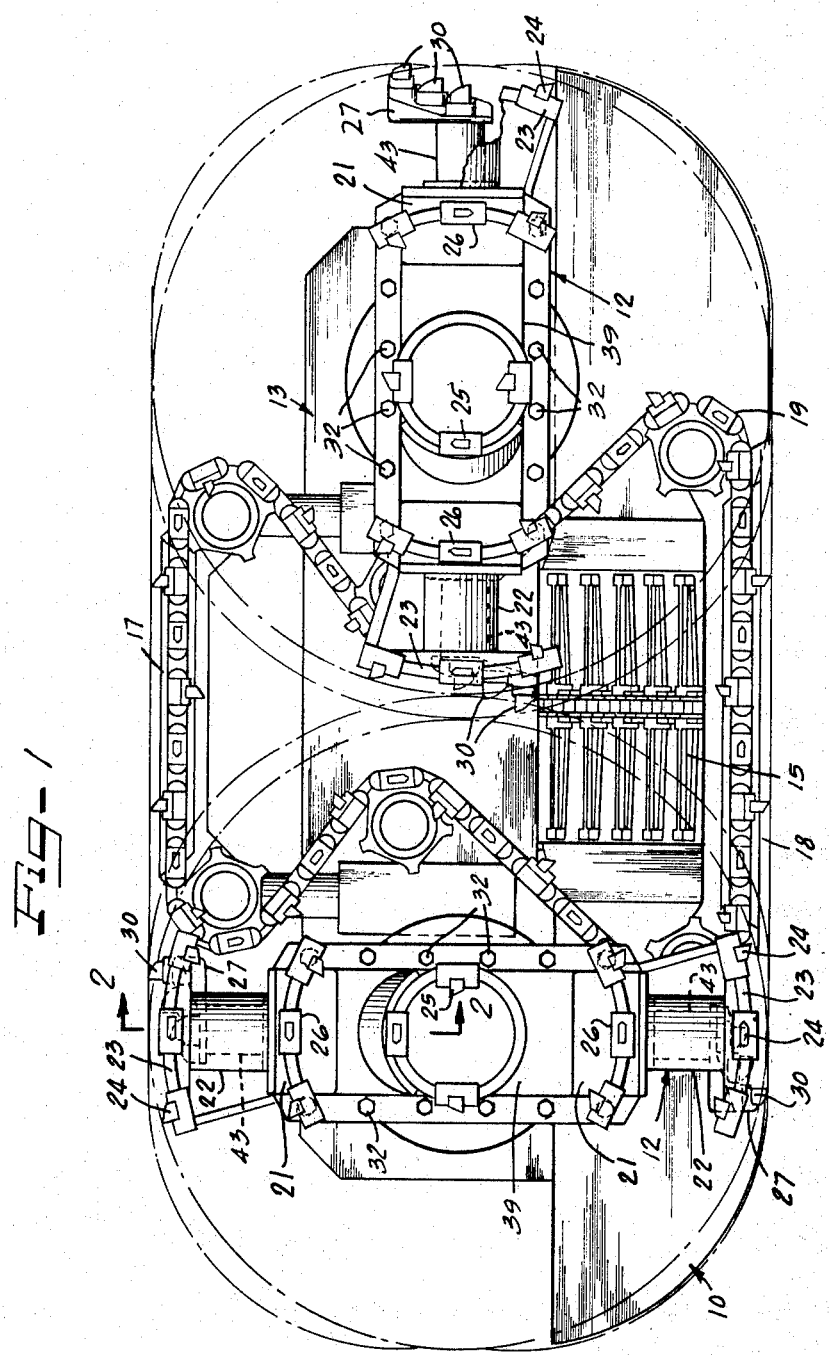

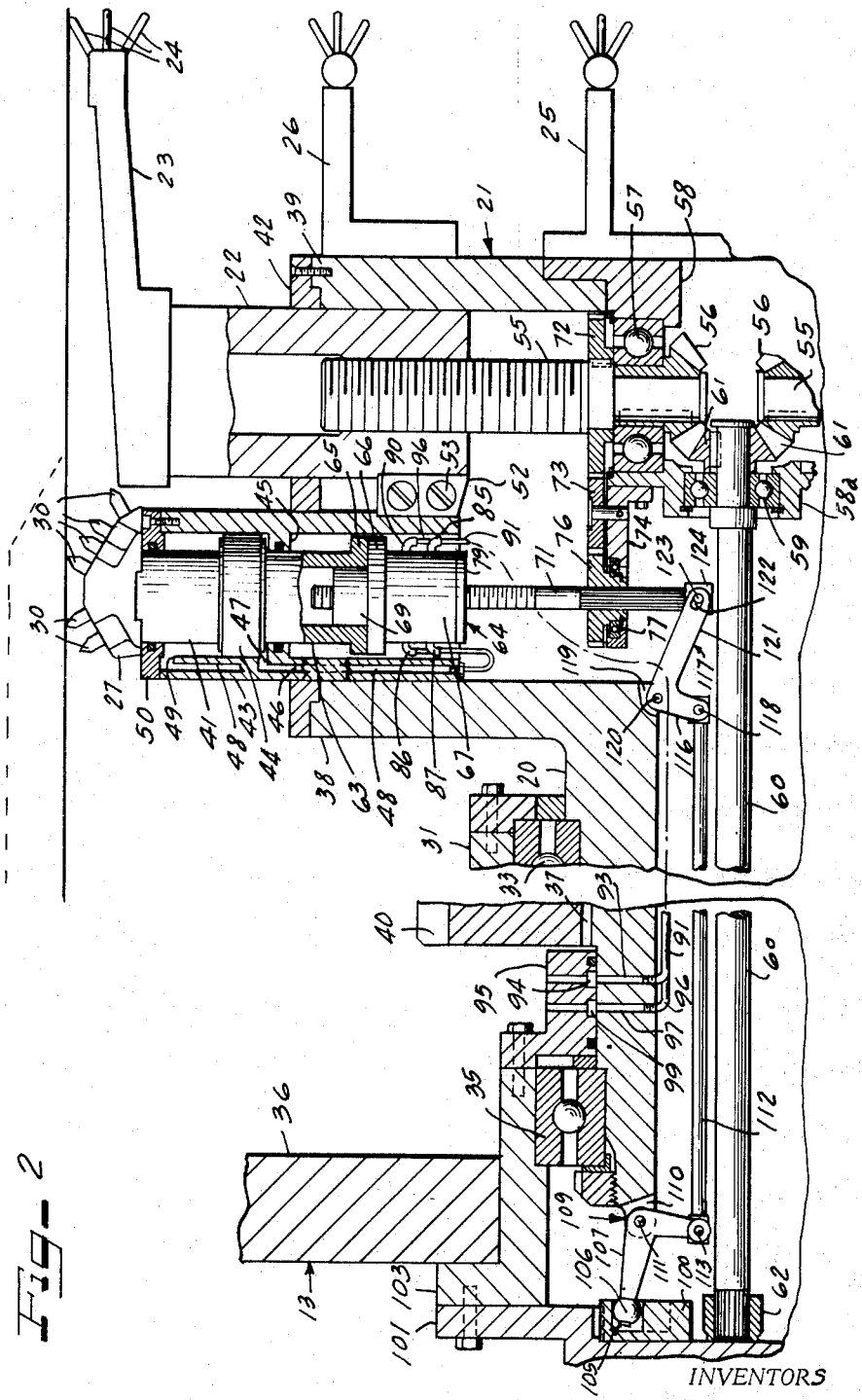

INVENTORS
HOWARD E. SHELLEY
RALPH F. RISSE
BY
ATTORNEYS

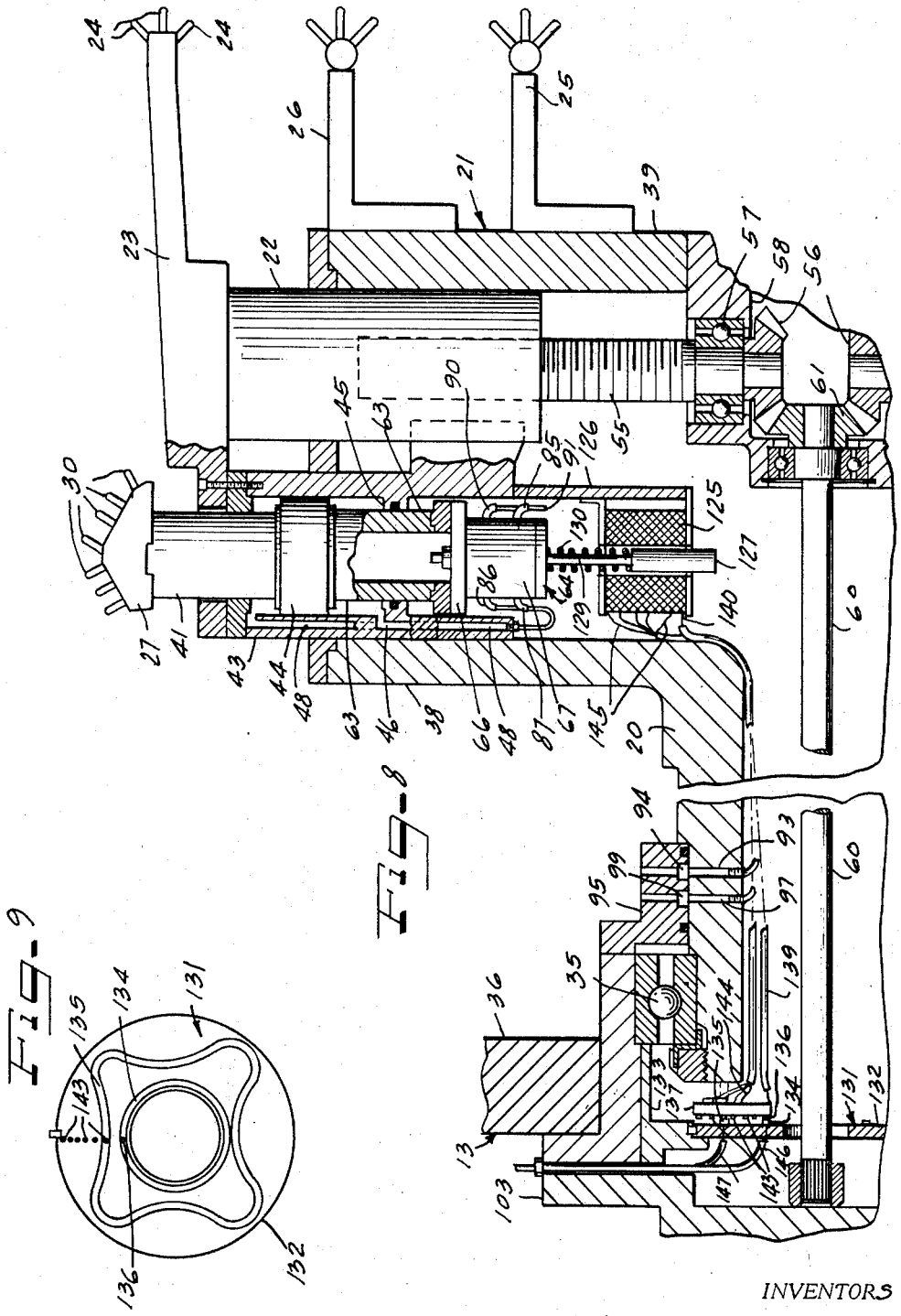

United States Patent Office 3,485,531
Patented Dec. 23, 1969

3,485,531
PROGRAM CONTROLLED CONTOUR CUTTING
BORING MINER
Ralph F. Risse, Oak Lawn, and Howard E. Shelley, Niles, Ill., assignors to Westinghouse Air Brake Company, Pittsburgh, Pa., a corporation of Pennsylvania
Filed Feb. 26, 1968, Ser. No. 708,233
Int. Cl. E21c 5/16; F15b 21/02
U.S. Cl. 299—1    18 Claims

ABSTRACT OF THE DISCLOSURE

Rotary contour cutting boring head having a contour cutter moved in and out by power means separate from the power means rotating the boring head. The separate power means is a hydraulic cylinder and the control means for the separate power means is a valve bringing the separate power means into operation at pre-selected times, to move the contour cutter in and out in accordance with a pattern determined by a "record.." The record may be a cam scanned by a "read-out means," which may be a follower. The record may also be on a magnetic tape, drum or disk, may be punched holes in a drum, tape or disk, a sheet of paper with a contour marked on it, or a single groove phonograph record. The read-out means picks up information from the record and in addition to a cam follower may be a magnetic pick-up head, a light sensitive cell, a light beam following a line on a record, a phonograph stylus or any other record pick-up member.

The read-out means or follower causes a control element to move in response to a change in condition of the read-out means. Movement of the control element provides the control for the separate power means and the contour cutter, to move the contour cutter in a pre-selected cutting pattern.

CROSS REFERENCES TO RELATED APPLICATIONS

The present application utilizes certain of the contour cutter principles of applications Ser. Nos. 546,974 and 580,029, filed by Edward F. Brill and Howard E. Shelley on May 2, 1966 and on Sept. 16, 1966, respectively, but differs from the disclosures of these applications in that the power means for moving the contour cutter in and out is separate from the power means for rotatably driving the boring head, and the control means for the separate power means brings the separate power means into operation to rectilinearly move the contour cutter at pre-selected times.

SUMMARY OF THE INVENTION AND OBJECTS

In a preferred embodiment of the invention, a contour cutter is associated with a rotary boring head and rotates with the rotary boring head and is translationally moved in and out during certain phases of the cycle of rotation of the boring head, to cut a bore of a pre-selected pattern. The separate power means is provided to move the contour cutter in and out relative to the axis of rotation of the boring head under the control of a pre-selected pattern, shown in one embodiment of the invention as comprising a cam scanned by a follower, connected to move a control element of the control means.

The control element may be the valve spool of a control valve, which is radially adjustable with the contour cutter and provides a pressure connection to a hydraulic cylinder, to cause the piston and the contour cutter, to translationally move pre-selected distances in accordance with the form of the pattern. The control element thus senses the position of the contour cutter relative to the axis of rotation of the boring head and provides feedback information to accurately control the position of the contour cutter.

The contour cutter is shown in the drawings as supplemental to and trailing a main boring assembly and as modifying the circular bore to a noncircular contour, although the contour need not necessarily be non-circular, but the contour cutter may enlarge or trim the bore mined by the main boring head.

A principal object of the present invention, therefore, is to provide an improved form of rotary boring head in which the bore is contoured to a desired form, determined by interchangeable pre-selected records.

Another object of the invention is to provide a novel and improved form of contour cutter for contouring the bore of a rotary boring head, in which the contour cutter is translationally moved in and out by power means independent of the power means for rotating the boring head, and in which a simple form of control means is provided for the power means, which provides a pre-selection of the cutting pattern made by the contour cutter.

Another object of the invention is to improve upon the boring heads of boring types of miners by providing a contour cutter rotatably moving in the direction of rotation of the boring head and by moving the contour cutter radially in and out relative to the axis of rotation of the cutter by a hydraulic motor under the control of a record, which may be interchanged to modify the contour of the bore, to mine in a pre-selected pattern.

Still another object of the invention is to provide a simple and improved power means for translationally moving a contour cutter contouring the bore made by a rotary boring head, in which a record and read-out means provides a control for bringing the power means into and out of operation at predetermined phases of the cycle of rotation of the boring head, to obtain a pre-selected contour of the bore.

These and other objects of the invention will appear from time to time as the following specification proceeds and with reference to the accompanying drawings.

DESCRIPTION OF THE DRAWINGS

FIGURE 1 is a front end view of a continuous mining machine constructed in accordance with the principles of the present invention, and diagrammatically illustrating the circular cutting paths of the boring heads and certain non-circular cutting paths of the contour cutters.

FIGURE 2 is a fragmentary transverse sectional view taken through one half of the boring head and its support, generally along lines 2—2 of FIGURE 1, with certain parts broken away.

FIGURE 3 is an enlarged detail fragmentary sectional view taken substantially along the same general lines as view taken in FIGURE 2, but showing the control valve for moving a contour cutter in and out, in section.

FIGURE 4 is a fragmentary sectional view taken substantially along line 4—4 of FIGURE 3 and showing the guiding connection between the valve spool and its valve housing, to hold the valve spool from turning movement.

FIGURE 5 is an enlarged fragmentary detail view looking at the control cam toward one side thereof and showing the follower in the cam.

FIGURE 6 is a fragmentary detail view, showing the connection from the cam to the control shaft, moving the valve spool of the control valve into its various operative positions.

FIGURE 8 is a longitudinal sectional view taken along the same general lines as FIGURE 2, but showing a modified form in which the invention may be embodied.

FIGURE 9 is a view looking at a contact plate, operating as a control pattern to vary translational movement of the contour cutter.

DESCRIPTION OF THE EMBODIMENT ILLUSTRATED

Figure 7:
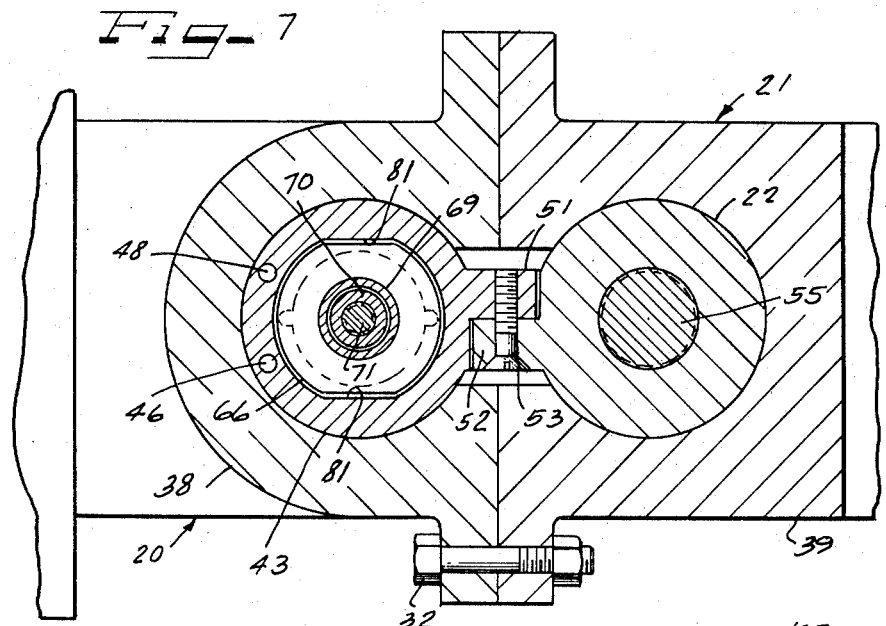
FIGURE 7 is a transverse sectional view taken substantially along line 7—7 of FIGURE 3.

FIGURE 1 of the drawings shows the front end of a continuous mining machine 10, of the rotary boring type. The mining machine 10 is supported on the usual laterally spaced continuous traction tread devices (not shown) which serve to tram the machine from working place to working place and to feed a pair of rotary boring heads 12, 12 into the working face of a mine in a conventional manner. The rotary boring heads 12, 12 are rotatably supported on a main supporting housing 13, for rotation about parrallel horizontal axes extending perpendicular to the working face of the mine and disposed on opposite sides of a conveyor 15 extending along the center of the machine for picking up and loading the loose mined material.

The main supporting housing 13 is adjustably supported to extend in advance of the main frame of the machine (not shown) in vertically spaced relation with respect to the ground, on the usual hydraulic jacks (not shown) and also forms the support for an upper trimmer bar 17 and a lower trimmer bar 18. The trimmer bars 17 and 18 form rectilinear guides for a trimmer chain 19, and guide said trimmer chain to trim the cusps left between the boring heads flush with the mine roof and floor.

The trimmer bars 17 and 18 are adjustably supported on the main supporting housing 13 in a conventional manner, to position the trimmer chain 19 to mine along the roof and floor of the mine and provide a clean level roof and floor. The trimmer chain 19, guided to pass along said upper and lower trimmer bars, is driven from conventional transmission gearing (not shown) in the main supporting housing 13, which rotatably drives the rotary boring heads 12, 12.

Each boring head 12 is supported on and extends diametrally of a hollow shaft 20 (FIGURE 2) and has boring arms 21 extending radially therefrom equal distances from opposite sides of the axis of rotation of said hollow shaft. The boring arms 21 have telescopic arms 22 mounted thereon for telescopic movement with respect thereto, to be retracted when traveling from working place to working place, and to be extended to position cutter supports 23 and cutter bits 24, carried by said cutter supports, to mine rotary bores generally tangentially of the roof and floor of a mine. Each boring head also includes a central pilot cutter 25 and intermediate cutter bit carrying arms 26, cutting annular kerfs spaced radially inwardly of the kerfs cut by the cutter bits 24 and radially outwardly of the central pilot cutter.

Contour cutter supports 27 are shown in FIGURE 2 as disposed behind the telescopic arms 22 for rotation therewith and for radial translational movement with respect thereto. The contour cutter supports 27 have cutter bits 30 extending therefrom in trailing relation with respect to the cutter bits 24 of the associated cutter supports 23, to contour the bore mined by said cutter supports 23 to a pre-selected non-circular contour, in a manner which will hereinafter more clearly appear as this specification proceeds.

The hollow shaft 20 is shown in FIGURE 2 as journaled in a hub 31, projecting forwardly of the front wall of the main supporting housing 13, on an anti-friction bearing 33. The hollow shaft 20 extends inwardly along the hub 31 within the main supporting housing 13, and is shown in FIGURE 2 as journaled at its inner end on an anti-friction bearing 35. The bearing 35 is mounted in an end wall 36 of the housing 13. The hollow shaft 20 has an intermediate splined portion 37 engaged by an internal splined portion of a drive gear 40. The drive gear 40 may be driven from an individual motor, (not shown) through a suitable gear reduction train (not shown). The opposite boring head may also be driven from an individual motor (not shown) in a similar manner. The two boring heads may be tied to rotate together by timing gearing (not shown), to effect rotation of the boring heads in timed relation with respect to each other towards the center of the machine along the floor, to progress the material mined toward the center of the conveyor 15. The motors and geared drive connections to the boring heads are no part of the present invention, so need not herein be shown or described further.

The diametrically opposed boring arms 21 each comprise a rear section 38 extending radially of the hollow shaft 20 and shown in FIGURES 2, 3 and 7 as formed integrally therewith, and a front section 39 abutting the rear section 38, and secured thereto, as by nuts and bolts 32.

The contour cutter support 27 is shown in FIGURE 2 as being supported on the end of a contour cutter arm in the form of a piston rod 41, extensible from a cylinder 43 and having a piston 44 thereon, intermediate the ends of said piston rod. As shown in FIGURES 3 and 7, the cylinder 43 extends downwardly into the rear section 38 of the boring arm 21 in parallel relation with respect to the telescopic arm 22, extending downwardly into the front section 39 of said boring arm. A cover plate 42 abuts the outer end portions of said front and rear sections and forms a slidable guide for said cylinder 43 and said telescopic arm 22.

The cylinder 43 has an intermediate wall 45, through which a lower end portion 63 of piston rod 41 extends.

A fluid pressure passageway 46 extends axially along the wall of the cylinder 43 and terminates into a port 47 on the underside of the piston 44 and above the intermediate wall 45, for supplying fluid under pressure to the piston 44, to extensibly move the piston rod 41 with respect to said cylinder. The cylinder 43 also has a passageway 48 extending along the wall thereof, parallel to the passageway 46 and terminating into a port 49 adjacent a head 50, defining the outward limit of travel of the piston 44. A control valve 64 adjustably movable with the cylinder 43, is provided to control the supply and release of fluid under pressure to opposite ends of the cylinder 43. The control valve senses the position of the cutter relative to its axis of rotation, and if for some reason the contour cutter 27 and piston rod 41 are moved to uncenter the valve 64 with respect to what the record is calling for, said control valve will automatically move the contour cutter into place.

The cylinder 43 has a connector lug 51 extending from the wall thereof along side of a connector lug 52 extending from the wall of the telescopic arm 22. The two connector lugs 51 and 52 are secured together by machine screws 53, to adjustably move the cylinder 43 along the boring arm 21, upon adjustable movement of the telescopic arm 22 and cutter support 23.

The telescopic arm 22 and cutter support are radially adjusted with respect to the boring arm 21 by an adjustment screw 55 threaded in said telescopic arm and extending radially along the hollow interior portion of said telescopic arm. A bevel pinion 56 is keyed or otherwise secured to the lower end of the adjustment screw 55 and is journaled on its hub in a bearing support 58 on an anti-friction bearing 57. The bearing support 58 is suitably mounted in the inner end of the boring arm 21 and may be generally cylindrical in form, providing a bearing support for a bevel pinion 56 and adjustment screws 55, and for a similar diametrically opposed bevel pinion 56 and adjustment screw 55, for adjustably moving the diametrically opposed telescopic arms 22 and cutter supports 23 on the ends thereof. The bearing support 58 also forms a support at its inner end for a bearing support 58ª for an anti-friction bearing 59, forming a bearing for an adjustment shaft 60 extending along the axial center of the boring head. A bevel pinion 61 is keyed or otherwise secured to the forward end of said shaft, and meshes with the bevel pinions 56, to adjustably move the telescopic arms 22 and cutter supports 23 together at the same rates of speed upon rotation of said shaft. The shaft 60 is connected with a splined coupling 62 at its rear end, which may be driven from a suitable drive mechanism for driving the shaft 60 to adjust the two telescopic arms 22 together and to hold said telescopic arms in adjusted relation with respect to each other.

The lower rod portion 63 of the piston rod 41 extends downwardly through and is sealed to the partition 45 and has a radially flanged lower end portion 65, abutting an end closure 66 for the upper end of a housing 67 for the valve 64. The end closure 66 has a sleeve portion 69 extending upwardly along the interior of the lower rod portion 63 of the piston rod 41 and forms a seal and slidable guide for the upper end portion of a valve spool 70. The valve spool 70 has a hollow interior portion which is threaded on a threaded adjustment actuator rod 71, for moving the valve spool 70 relative to the valve housing 67, to control the supply and release the fluid to and from the fluid pressure passageways 46 and 48, to effect translational movement of the piston rod 41 in a selected direction. The rod 71 also adjustably moves the spool 70 with the valve housing 67 and cylinder 43. An end closure 79, closes the lower end of the valve housing 67, and is suitably sealed to said housing and valve spool.

The actuator rod 71 is rotatably driven from the adjustment screw 55 in the direction of rotation of the adjustment screw 55, through a spur gear 72 keyed or otherwise secured to the adjustment screw 55. The spur gear 72 meshes with an intermediate gear 73 mounted on a bearing support 74 secured to and extending rearwardly of the bearing support 58ª. The intermediate gear in turn meshes with and drives a spur gear 76 journaled on its hub in the bearing support 74 on anti-friction bearings 77. The lower end portion of the adjustment shaft 71 is splined and has slidable engagement with the hub of the spur gear 76 to effect a drive to the rod 71 in all positions of radial adjustment of said rod with respect to the spur gear 76. The leads of the threads of the adjustment screw 55 and rod 71 are such as to adjustably move the valve spool 70 the same distance as adjustable movement of the telescopic arm 22 and cylinder 43.

The valve spool 70 has an enlarged upper end portion having parallel chordal wall portions 80, engaging corresponding chordal wall portions formed in the interior wall of the sleeve portion 69, extending from the end closure 66, to hold said valve spool from turning movement with respect to the valve housing 67 upon rotatable movement of the actuator rod 71.

In a like manner the hollow interior portion of the cylinder 43 extending beneath the partition 45 has parallel chordal wall portions 81 slidably engageable with similar chordal wall portions formed in the radial flange 65 on the lower end portion 63 of the piston rod 41 and with similar chordal wall portions formed in the end closure 66 to prevent turning of said piston rod and valve housing 67 relative to said cylinder.

The valve housing 67 has an inlet fitting 85 leading thereinto and affording communication with the interior portion of said valve housing and the valve spool 70, to supply fluid under pressure to either one of two fittings 86 and 87, leading from said valve housing. The fittings 86 and 87 are connected with the respective fluid passageways 46 and 48, through pressure lines 88 and 89 respectively, to supply fluid under pressure to one side of the piston 44 and release fluid under pressure from the opposite side of said piston through an outlet fitting 90, leading from said valve housing, and returning fluid to tank (not shown). The portion of the valve spool 70 within the valve housing 67 has the usual spaced lands to direct fluid under pressure from the inlet fitting 85 to a selected fitting 86 or 87, dependent upon the position of the valve spool, and to return fluid from either side of the piston 44 to the outlet fitting 90, in a conventional manner.

The inlet fitting 85 has a fluid pressure line 91 leading therefrom along the hollow interior of the hollow shaft 20 and connected with a radial passageway 93, leading through said hollow shaft 20 and having communication with an annular passageway 94 in a manifold 95. The annular passageway 94 is connected with a source of fluid under pressure in a suitable manner, which need not herein be shown or described, since it forms no part of the present invention. In a like manner a return line 96 leads from the fitting 90 and has connection with a radial passageway 97 in communication with an annular passageway 99 in the manifold 95, which annular passageway is connected to tank in a suitable manner.

Referring now in particular to the means for moving the valve spool 70 along the valve housing 67 to supply fluid under pressure to one side of the piston 44 and release fluid under pressure from the opposite side of said piston, and thereby move the contour cutter support 27 translationally during rotatable movement thereof, to position the cutter bits 30 supported thereon to cut in a pre-selected pattern, an annular cam plate 100 is mounted in an end plate 101 for a support 103 for the anti-friction bearing 35. The support 103 abuts the rear face of the end wall 36 of the main supporting housing 13 and extends within said main supporting housing. The cam plate 100 has an irregular cam groove 105 formed therein and extending about the axis of rotation of the hollow shaft 20 and mining head 12. The cam groove 105 is diagrammatically shown in FIGURE 5 as being of an irregular form to enlarge the bore along the mine roof to provide increased ventilating space between the main supporting housing 13 and opposite ribs of the working place and to mine the ribs below the center line of the boring head to generally conform to the bores mined by the mining heads 12. The pattern of the cam, however, may be of various pre-selected forms and may be formed to enlarge the bore along both the roof and floor of the mine to not only increase the ventilating space along the roof but to also widen the floor to facilitate tramming and maneuvering of the machine.

The cam groove 105 is engaged by a follower 106 of a general ball like form rotatably mounted on the end of an arm 107 of a bell crank 109. The bell crank 109 is shown as being pivotally mounted between spaced ears 110 projecting rearwardly of the hollow shaft 20, on a pivot pin 111. The other lever arm of the bell crank 109 depends from the pivot pin 111 and is pivotally connected to the inner end of the rod 112 on a pivot pin 113. The rod 112 extends forwardly along the hollow interior portion of the shaft 20 and is pivotally connected at its forward end on an arm 116 of a bell crank 117, on a pivot pin 118. The bell crank 117 is pivoted intermediate its ends in a recess 119 formed in the hollow interior portion of the boring arm 21 on a pivot pin 120. An arm 121 of a bell crank 117 has a forward end portion in the general form of a yoke having slots 122 in opposite arms of the yoke, slidably engaging trunnion pins 123 extending diametrically of a shifting collar 124. The shifting collar 124 is rotatably mounted on the lower end of the valve actuator rod 71 and abuts a downwardly facing shouldered portion 72ª of teh actuator rod 71. A cap 125 is secured to the bottom of the actuator rod 71 and abuts the bottom surface of the collar 124 to retain said collar to said rod. The shifting collar 124 thus moves said rod up and down as the follower 106 moves along the cam groove 105 and accommodates free rotation of said rod to vertically adjust the valve spool 70 upon vertically adjutable movement of the telescopic arm 22 and cylinder 43.

The plate 101 may be detachably mounted on the bearing support 103 to accommodate removal of said plate from the rear end portion of the main supporting housing 13, to replace the cam plate 100 with other cam plates having different cam patterns, selected in accordance with the required contour of the bore.

It may be seen from the foregoing that as the hollow shaft 20 and mining head 12 is rotatably driven by the gear 40 that the follower 106 will rockably move the bell crank 109 about the axis of the pivot pin 111 and impart a rocking movement to the bell crank 117 and rod 112, to thereby move the actuator rod 71 in and out and thereby move the valve spool 70 to effect radial movement of the contour cutter support 27 during certain portions of the cycle of rotation of said contour cutter, as selected by the pattern of the cam groove 105. It should be understood that a flexible cable of the Bowden wire type may be substituted for the actuator rod 71 and be directly connected from the valve spool 70 to the bell crank 109, to operate said valve spool, if desired.

In FIGURES 8 and 9 of the drawings, I have shown a modified form of operating and control means for the valve spool 70. The mining head 12, telescopic arm 22, contour cutter 27 and operating and support means therefor, are of the same general construction as in the form of my invention illustrated in FIGURES 1 through 7, so like part numbers will be applied to the same parts as in FIGURES 1 through 7.

In FIGURE 8, I have shown an electromagnetic coil 125 supported on a bracket leg 126 extending radially inwardly of the end of the cylinder 43 and secured thereto for adjustable movement therewith and with the telescopic arm 22. An armature 127 extends along the hollow interior portion of the electromagnetic coil 125 has a valve actuator rod 129 extending upwardly therefrom through the valve housing 67, and having operative connection with the valve spool 70 in a suitable manner, for moving said valve spool along the valve housing upon translational movement of said rod, to effect translational movement of the contour cutter support 27 during certain cycles of rotation thereof, in the same manner the actuator rod 71 moves the valve spool along the valve housing 67. A spring 130 encircles the rod 129 beneath the valve housing 67, and abuts the bottom of said valve housing and the armature 127, to bias the armature and rod 129 radially inwardly with respect to the valve housing.

A record 131 is provided to energize the solenoid coil 125 in stages and effect movement of the armature 127 along said coil against the spring 130 in accordance with the strength of said coil determined by the number of turns of said coil which are energized. The record 131 is herein shown as being in the form of an annular disk 132 made from insulating material and mounted in the radial flange of an internally flanged collar 133, mounted within the bearing support 103 and retained from movement with respect to said bearing support. The disk 132 has a circular contact 134 extending about the shaft 60 and concentric with said shaft. A non-circular contact 135 also extends about said disk in radially outwardly spaced relation with respect to the contact 134, and is formed in accordance with a pre-selected cutting pattern.

The circular contact 134 engages a contact 136 on a contact block 137, suitably mounted on the inner end portion of the hollow shaft 20 for rotation therewith and made from an insulating material. The contact 136 has electrical connection with a conductor 139, connected with a lead 140 of the solenoid coil 125 adjacent the inner end of said solenoid coil. The contact block 137 also has a series of radially spaced contacts 143 spaced along a radial line extending through the axis of rotation of the boring head 12, and rotating therewith. The contacts 143 are connected with conductors 144 extending along the hollow interior portion of the shaft 20 and connected with leads 145 connected with separate windings of the solenoid coil 125, to energize said coil and increase the strength thereof, as the leads connected with the individual windings are successively energized from the lead 145 closest to the lead 140 to the lead 145 farthest from the lead 140. This will effect movement of the armature 127 toward the valve housing 67 in accordance with the windings of the solenoid coil 125 energized, to bring the piston rod 41 radially outwardly of the cylinder 43, and to retract said piston rod within said cylinder, as the windings are successively deenergized.

It should be here understood that as long as there is power in the circuit, the lead 140 and the next adjacent lead 145 will always be energized, to hold the armature 27 and valve spool in pre-determined relation with respect to the valve housing 67.

The concentric conductor 134 and the endless non-circular conductor 135 are energized through conductors 146 and 147 respectively.

It may be seen from FIGURE 9 that as the boring head 12 is rotatably driven, the irregular conductor 135 will successively engage the contacts 143, to increase or decrease the magnetic strength of the electromagnetic coil 125 and that a change in the form of the conductor 135 will result in a change in the contour of the bore.

FIGURES 10, 11, 12 and 13 show various forms of records and read-out means which may be utilized to control energization of the turns of the electromagnetic coil 125 in place of the stationary contact disk 132 and the rotating contact block 137. These forms of records and read-out means are conventional so need not herein be shown or described in detail.

Figure 10:
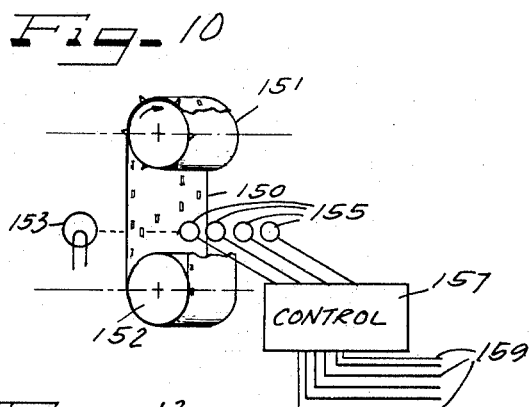
FIGURE 10 is a diagrammatic view diagrammatically showing a perforated record tape, controlling translational movement of the contour cutter and the resultant contour of the bore.

In FIGURE 10 a punch record 150 is shown as being in the form of an endless belt trained about drive and idler drums 151 and 152 respectively, which are driven by power in a conventional manner. A source of light 153 may be located on one side of one run of the belt while a series of photo-electric cells 155 may be located between the runs of the belt. The photo-electric cells 155 are connected with a control 157, and pick-up light beams passing through perforations in the belt, to vary the extent of energization of the electromagnetic coil 125 through conductors 159, connected with the leads 140 and 145 of the electromagnetic coil 125, to vary the degree of energization of said coil, in the same manner as in the form of the invention illustrated in FIGURE 8.

Figure 11:
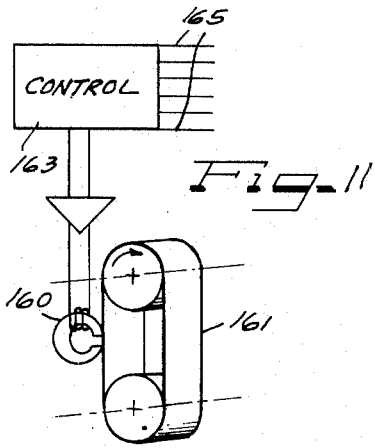
FIGURE 11 is a diagrammatic view showing a modified form of record in which the record is in the form of a magnetic tape.

In FIGURE 11 a playback pick-up head 160 is shown as being in association with an endless magnetic belt 161, which may have a pre-selected record recorded thereon. The playback pick-up head 160 transmits the record to a control 163 connected with the leads 140 and 145 of the electromagnetic coil 125 through conductors 165.

Figure 12:
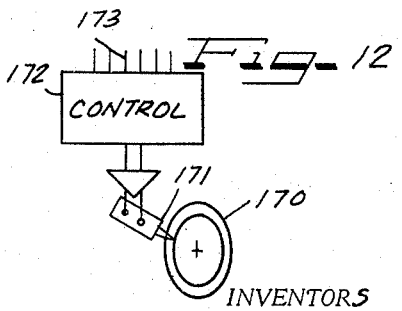
FIGURE 12 is a diagrammatic view showing still another form in which the control may be embodied, showing the record in the form of a single groove phonograph record, having varying frequency or amplitude on the record.

In FIGURE 12 the control is shown as being a single record track 170 of varying amplitudes and frequencies. The signal of the record track is picked up by a phonograph stylus 171 and is transmitted to a control 172 connected to the leads 140 and 145 through a series of conductors 173 to energize pre-selected turns of the electromagnetic coil 125 in accordance with the signal picked up by the stylus.

Figure 13:
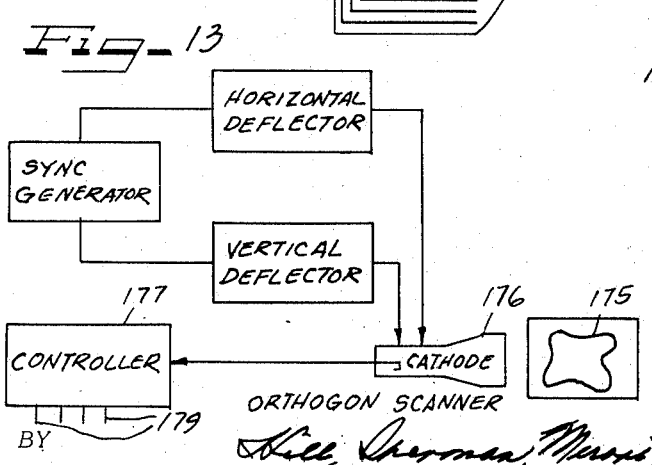
FIGURE 13 is a diagrammatic view showing still another form of record and read-out means, in which the record is in the form of a line on a sheet of paper.

FIGURE 13 diagrammatically illustrates the scanning of the record 175 on a sheet of paper or cardboard by an orthogon scanner tube 176. A controller 177 is conected with the cathode of the orthogon scanner tube and may have electrical connection with the leads of the electromagnetic coil 125 through a series of conductors 179 leading from said controller and corresponding to the leads 140 and 145.

The foregoing pick-up and control systems may be mounted on the outside of the boring head to facilitate the changing of records and may have electrical connection with the leads of the electromagnetic coil 125 through the hollow interior portion of the shaft 20 in any suitable manner. The controls also may vary the strength of the coil 125, by varying the current supplied to said coil, instead of energizing separate turns of the coil, in which case only two conductors need lead from the control for connection to the coil.

It may be seen from the foregoing that since the valve housing 67 is connected with the piston rod 41 to move in and out with the piston rod, and may move relative to the valve spool at times, that the valve housing always senses the position of the contour cutter cupport 27. If for some reason the contour cutter support 27 and piston 44 should tend to move the valve housing to uncenter the valve spool 70 with respect to the position of said valve spool required by the record, the valve spool under the control of the record, will automatically move the contour cutter into place in accordance with the contour of the record.

It may also be seen that the form of the record may be pre-selected in accordance with the contour of the bore required and that the contour of the record is determined by the required contour of the bore. That is, the contour of the record may be such as to extend the contour cutters as they move away from each other as they approach the mine roof to reduce the cusps between the boring heads and to thereby reduce the amount of material that must be mined by the trimmer chains. They then may be retracted to the diameter of the bore as they reach the mine roof and may again be extended as they leave the roof and approach the ribs of the working place to widen the roof, and thereby increase the ventilating space between the main supporting housing 13 and the roof and ribs of the working place. In a similar manner the record may be widened along its lower margins to extend the contour cutters as they approach the floor to provide increased space for the continuous traction tread devices of the machine, and to thereby increase the maneuverability of the machine. The cutting patterns of the contour cutter all under the control of pre-selected records may thus be varied from circular to wide generally oval cutting patterns, and the principles of the invention are not restricted to boring types of miners having boring heads mining contiguous bores in a mine face, but are applicable to single bore tunneling machines, where an oval or horseshoe shaped contour cut is desirable, and also are applicable for cutting non-circular holes in wood, plastics, metal and the like.

While we have herein shown and described several forms in which the invention may be embodied, it may readily be understood that various other variations and modifications in the invention may be attained without departing from the spirit and scope of the novel concepts thereof.

We claim as our invention:

1. A rotatable cutting assembly including a contour cutter which is movable relative to the axis of rotation of said cutting assembly,
    power means for rotating said cutting assembly,
    separate power means for moving the contour cutter relative to the axis during rotation thereof,
    and control means, including a pre-selected record of a cutting contour, for controlling said separate power means to move said contour cutter relative to the axis in a pattern corresponding to the record, during rotation of the assembly.

2. A rotatable cutting assembly in accordance with claim 1,
    wherein the separate power means is a hydraulic power means,
    wherein the hydraulic power means is connected with the contour cutter to move the cutter toward and from the axis,
    wherein the control means includes a hydraulic power control valve, and
    wherein the hydraulic power control valve controls said hydraulic power means to move said cutter relative to the axis in a pattern corresponding to the pre-selected record during rotation of the assembly, 3. A rotatable cutting assembly in accordance with claim 1, including,
    sensing means sensing the position of the contour cutter relative to the axis, and wherein said control means controls said separate power means in response to position feedback information from said sensing means, to move said contour cutter relative to the axis in a pattern corresponding to the record during rotation of the assembly.

4. In a contour boring machine,
    a supporting frame,
    a boring assembly journalled on said frame for rotation about an axis,
    power rotating means for rotating said boring assembly about an axis,
    a contour cutter carried by said rotating boring assembly for movment relative to said axis,
    power extending and retracting means operable independently of said power rotating means for moving said contour cutter relative to sad axis during operation of said power rotating means,
    a cutting contour record,
    read-out means effective to scan said record at a rate proportional to rotation of the assembly,
    means for changing a condition of the read-out means responsive to scanning of said record,
    and control means effective to control said power extending and retracting means during rotation of said power extending and retracting means to move said cutter relative to said axis in response to change of condition of said read-out means to cut a bore pattern in a work face corresponding to said cutting contour record.

5. A contour boring machine in accordance with claim 4,
    wherein sensing means is provided to sense the position of the cutter relative to the axis, and
    wherein the sensing means controls the power extending and retracting means to move the cutter relative to the axis in response to a changing condition of said read-out means, to cut a bore pattern in a working face corresponding to said contour cutting record.

6. A contour boring machine in accordance with claim 4,
    wherein means is provided enabling relative movement between the record and the read-out means simultaneously with and at a rate proportional to rotation of the boring assembly,
    wherein means are provided for changing a condition of the read-out means responsive to said relative movement between the record and the read-out means,
    wherein changing conditions of said read-out means effects operation of said control means to control said power extending and retracting means to move said cutter relative to said axis in response to changing conditions of said read-out means, to cut a bore pattern in a working face corresponding to said cutting contour record.

7. A contour boring machine in accordance with claim 4, including,
    means for causing relative movement between the record and the read-out means simnltaneous with and at a rate proportional to rotation of said boring assembly,
    other means for changing a condition of the read-out means responsive to said relative movement between the record and the read-out means,
    a control element movable in response to changing condition of said read-out means, and wherein movement of said control element effects movement of said power extending and retracting means independently of said power rotating means to move said cutter relative to said axis to cut a bore pattern in a working face corresponding to said cutting contour record.

8. A contour boring machine in accordance with claim 4, including, means enabling the read-out means to scan the record simultaneous with and at a rate proportional to rotation of said boring assembly, means for changing a condition of the read-out means responsive to scanning of the record by the read-out means, and wherein the control means includes a control element movable in response to changing condition of said read-out means, wherein movement of said control element effects movement of said power extending and retracting means independently of said power rotating means to move said cutter relative to said axis to cut a bore pattern in a non-rotating working face corresponding to said cutting contour record.

9. A contour boring machine in accordance with claim 4, including, means causing relative movement between the record and the read-out means simultaneous with and at a rate proportional to rotation of said boring assembly, means for changing a condition of the read-out means responsive to said relative movement between the record and the read-out means, wherein the control means includes a control element movable in response to change in condition of said read-out means, and control valve means connected between said control means and said cutter, and wherein the power extending and retracting means comprises hydraulic power extending and retracting means operable independently of said power rotating means to move said cutter relative to said axis in response to actuation of said control valve means by said control element, to cut a bore pattern in a working face corresponding to said cutting contour record.

10. A contour boring machine in accordance with claim 4, including, means for changing a condition of the read-out means responsive to scanning of the record by the read-out means, wherein the control means includes control valve means having relatively movable spool and body elements, one of said elements being movable in response to a change in condition of said read-out means and the other of said elements being connected for movement with said contour cutter, and wherein the power extending and retracting means comprises hydraulic power actuated cylinder and piston means operable independently of said power rotating means to move said cutter toward or away from said axis in response to relative movement between said elements to cut a bore pattern in a working face corresponding to said cutting contour record.

11. A contour boring machine in accordance with claim 4, wherein the cutting contour record comprises a cam,
wherein the read-out means comprises a cam follower,
wherein means are provided causing relative movement between the cam and the follower simultaneous with and at a rate proportional to rotation of said assembly to change the position of said follower responsive to said relative movement between said cam and follower, wherein the control means comprises control valve means connected between said follower and said cutter and having operative connection with said follower for actuation by changes in position of said follower, and wherein the power extending and retracting means comprises said power rotating means to move said cutter relative to said axis in response to actuation of said control means to cut a bore pattern in a working face corresponding to said cutting contour record.

12. In a contour boring machine, a supporting frame, a boring assembly journalled on said frame for rotation about an axis, a power rotating means for rotating the boring assembly, a boring arm telescopically mounted in said boring assembly for radial adjustment relative to the axis of rotation, a contour cutter assembly, secured to and rotatably movable with said boring arm, adjusting means for radially adjusting and holding said boring arm and the attached contour cutter assembly in their radial adjusted positions, wherein the contour cutter assembly comprises a contour cutter arm having a contour cutter support on one end thereof, a separate power means for translationally moving said contour cutter arm and said cutter support in and out during rotation of said contour cutter assembly, and a control means for selectively bringing said separate power means into operation during certain preselected phases of the rotational cycle of the contour cutter assembly.

13. The contour boring machine structure of claim 12, including, a cutting contour record, a read-out means scanning said record whereby a change of condition of the read-out means responsive to scanning the said record causes the said control means to selectively bring the said power means into operation to cut a bore pattern in accordance with the contour of said cutting contour record.

14. The contour boring machine structure of claim 13, wherein the control means includes a control element, wherein a linkage connection connects the read-out means to the control element whereby an actuating translational movement is imparted to the control element by operation of said linkage, to selectively bring said power means into operation.

15. The structure of claim 14, wherein the control means is a hydraulic valve,
wherein the control element is a valve spool,
wherein the power means is a hydraulic cylinder,
whereby a movement of the spool in a first direction provides connection from a source of supply of fluid under pressure to one end of said hydraulic cylinder and movement of said valve spool in a second direction provides connection from a source of supply of hydraulic fluid under pressure to the second end of the hydraulic cylinder.

16. The structure of claim 15, wherein the adjusting means includes means to adjust the hydraulic valve as the boring arm and contour cutter are radially adjusted to maintain said valve spool in centered relation in all positions of radial adjustment of the boring arm and contour cutter.

17. The structure of claim 12, wherein the separate power means for translationally moving said contour cutter support in and out during rotation of said contour cutter assembly includes a cylinder telescopically mounted in said contour cutter assembly for radial adjustable movement with the boring arm telescopically mounted in the boring assembly, wherein a piston is movable along said cylinder and a piston rod is extensible from said cylinder and with said piston and cylinder comprises said contour cutter arm and supports said contour cutter support on the outer end of said piston rod,
wherein said piston rod also extends from said piston axially inwardly along said cylinder,
wherein the control means comprises a valve having a valve housing secured to said piston rod for movement therewith and having a spool within said housing movable relative to said housing,
wherein a radial rod has adjustable connection with said valve spool for moving said valve spool along said valve housing,
wherein a threaded shaft is provided for adjustably moving said telescopic boring arm and said cylinder and adjusting said contour cutter support in accordance with radial adjustment of said telescopic boring arm,
wherein a power drive connection is provided to said shaft for rotating said shaft and holding said shaft stationary relative to said telescopic boring arm, and
wherein a drive connection is provided from said threaded shaft to said radial rod to rotatably drive said rod and effect radial adjustment of said valve spool in accordance with the radial adjustable movement of said valve housing and said cylinder.

18. The structure of claim 17,
wherein a contour cutter record is provided,
wherein a read-out means is provided to scan said record,
wherein a linkage connection connects said read-out means to said rod to effect radial movement of said rod and valve spool in accordance with the position of said read-out means relative to said record, to thereby move said valve spool in said valve housing to selectively bring said power means into operation.

References Cited
UNITED STATES PATENTS

| | | | |
|---|---|---|---|
| 2,882,031 | 4/1959 | Hlinsky | 299—61 |
| 2,882,864 | 4/1959 | Booth et al. | 91—37 |
| 3,014,390 | 12/1961 | Garde et al. | 91—37 X |

ERNEST R. PURSER, Primary Examiner

U.S. Cl. X.R.

91—37

PO-1050
(5/69)

UNITED STATES PATENT OFFICE
CERTIFICATE OF CORRECTION

Patent No. 3,485,531          Dated December 23, 1969

Inventor(s) Ralph F. Risse and Howard E. Shelley

It is certified that error appears in the above-identified patent and that said Letters Patent are hereby corrected as shown below:

Column 7, line 2, change "teh" to --the--.

Column 10, line 26, change "sad" to --said--.

Column 12, after line 1, insert --prises hydraulic means operable independently of--.

SIGNED AND
SEALED
JUN 9 1970

(SEAL)
Attest:

Edward M. Fletcher, Jr.
Attesting Officer

WILLIAM E. SCHUYLER, JR.
Commissioner of Patents